United States Patent
Barriere

[15] 3,680,821
[45] Aug. 1, 1972

[54] SUPPORT DEVICE FOR A SEAT, IN PARTICULAR FOR A VEHICLE

[72] Inventor: Alain Barriere, Montbeliard, France

[73] Assignees: Automobiles Peugeot, Paris; Regie Nationale Des Usines Renault, Billancourt, France

[22] Filed: Nov. 4, 1970

[21] Appl. No.: 86,701

[30] Foreign Application Priority Data

Dec. 2, 1969 France..........................6941569

[52] U.S. Cl. ....................248/371, 248/419, 297/328
[51] Int. Cl. ..............................................B60n 1/02
[58] Field of Search......248/371, 361, 397, 407, 408, 248/409, 384, 378, 394, 395, 396, 157, 419, 420, 421, 423, 354 S; 297/313, 316, 325, 326, 327, 328

[56] References Cited

UNITED STATES PATENTS

| | | | |
|---|---|---|---|
| 2,383,173 | 8/1945 | Watter | 297/328 |
| 2,527,905 | 10/1950 | Berecki | 248/421 |
| 2,594,882 | 4/1952 | DeRose | 248/394 |
| 3,049,330 | 8/1962 | Coans et al. | 248/419 |
| 3,198,575 | 8/1965 | Hawkins | 297/328 |
| 3,327,985 | 6/1967 | Levit et al. | 248/408 |

FOREIGN PATENTS OR APPLICATIONS 1,052,825  9/1953  France..........................248/409

Primary Examiner—Marion Parsons, Jr.
Attorney—Burns, Doane, Swecker & Mathis

[57] ABSTRACT

A device adapted to permit a fine and precise adjustment in height of the front part of the cushion of a seat independently of the adjustment in the longitudinal direction of the seat. The device comprises a rack to which is pivoted a link and a stop pawl mounted to pivot about an axis on a support fixed to the floor. A mechanism which locks the pawl in engagement with the rack comprises a lever which effects successively in the course of the same travel the unlocking of the pawl and its disengagement from the rack.

4 Claims, 4 Drawing Figures

SUPPORT DEVICE FOR A SEAT, IN PARTICULAR FOR A VEHICLE

The present invention relates to seats, in particular for vehicles.

It is particularly important for obvious reasons of safety to improve as far as possible the driving position of the driver of the vehicle to reduce fatigue. Consequently, vehicle seats are usually mounted in such manner as to be adjustable longitudinally, in height and in inclination.

Seats are known in which the support device comprises an adjustable rear support and a front support constituted by at least one link pivoted to the seat and floor. It will be understood that when the seat is shifted in the longitudinal direction, the upper end of the link connected to the seat describes an arc of a circle which affects the height of the front part of the seat. However, in this case, the two movements of adjustment, namely the longitudinal and vertical movements, cannot be effected independently of each other and for each longitudinal position of the seat there is a corresponding height and a corresponding inclination of the seat cushion.

Other devices are known in which such an independent adjustment is made possible by the provision, for the lower pivot pin of the link, of an aperture whose height is substantially greater than the diameter of the pin and in which a withdrawable finger element defines two possible locations for said pin respectively in the lower part and upper part of said aperture. This mechanism therefore permits a selection between only two possible levels for the front part of the seat independently of the longitudinal position of the seat.

In another support device there are provided two or three possible apertures at different levels for one of the pivot pins of the support link, but in this case, to modify the adjustment, it is necessary to disengage the pin from one of the apertures and place it back in position in one of the other apertures. This is hardly practical and entails getting off the seat and even leaving the vehicle.

In addition to their aforementioned drawbacks, the last two devices have the essential drawback of affording only a very limited number of possible positions so that the differences in level between two adjacent positions are necessarily large and/or the overall range of adjustment is very limited.

The object of the invention is to provide a device which does not have these various drawbacks.

The invention provides a seat support device, in particular for a vehicle, comprising rear support means and front support means, the front support means having at least one link connected to the floor of the vehicle by a mechanism which is adjustable in height, said mechanism comprising two complementary toothed or notched elements one of which is connected to the seat and the other to the floor, guide means for the element connected to the seat, and shifting and locking means for disconnecting or maintaining said elements engaged so as to allow either an adjustment in height or the locking of the element connected to the seat in the selected position by the element connected to the floor.

One embodiment of the invention will now be described with reference to the accompanying drawings, in which:

FIG. 1 shows by way of example a seat S having a cushion or seat proper A and a backrest D. This seat is longitudinally adjustable by a sliding motion in rear slideways G and a swinging motion of a front link B.

Figure 1:
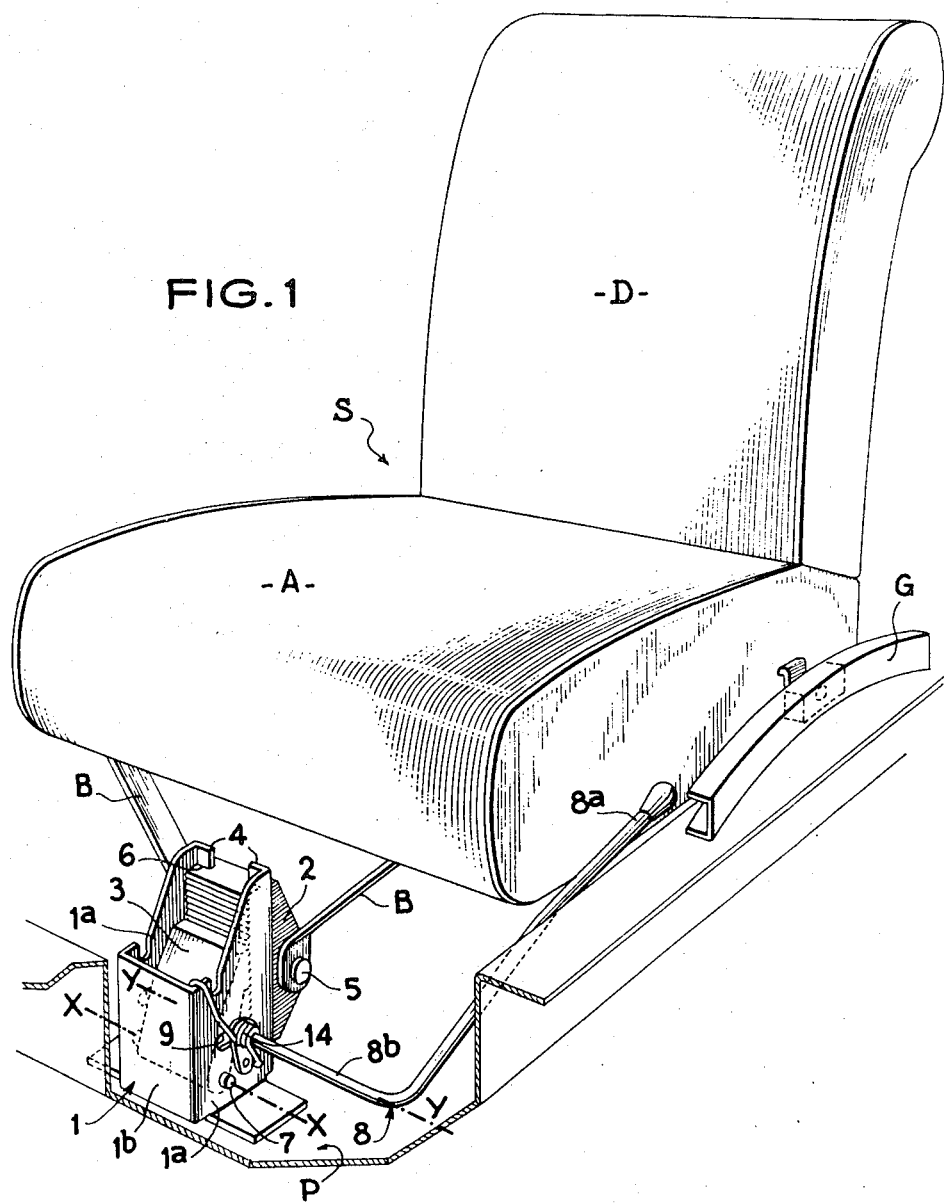
FIG. 1 is a perspective view of a vehicle seat equipped with a device according to the invention.

The mechanism according to the invention, which permits the front part of the cushion to be adjusted in height and therefore permits the inclination of the cushion to be adjusted, comprises a support member 1 integral with the floor P of the vehicle, a rack 2 and a withdrawable toothed pawl 3. The support 1 has two parallel wing portions 1a which are interconnected by a transverse wall 1b and terminate at their free edges in two inwardly extending flanges 4. The link B is pivoted by a spindle or pin 5 to the rack 2 which has two vertical grooves 6 receiving the vertical flanges 4 of the support 1.

The stop pawl 3, whose teeth have a shape complementary to that of the teeth of the rack, is rotatably mounted on the member 1 by journal means 7 having an axis X—X parallel to the pivot axis of the link B. The journal means 7 can be a pin extending transversely between the wing portions 1a, or two aligned journals.

The shifting and locking mechanism comprises a cranked lever 8 having at one end a knob 8a and at the other end a straight portion 8b which has an axis Y—Y (FIG. 2) and extends through two aligned apertures 9 of oblong shape formed in the wing portions 1a of the support member. The general shape of the apertures is an arc of a circle roughly centered on the axis X—X. The portion 8b is rotatable in an aperture or bore 10 provided in the center part of the pawl 3. It carries a crank consisting of an arm 11 and a finger portion 12 which is received in an opening 13 formed in one of the wing portions of the member 1. The opening 13 is substantially L-shaped, one of the branches 13a of the L-shaped opening 13 is centered on the axis Y—Y when the pawl is engaged with the rack (FIG. 2) and the other branch 13b is centered on the axis X—X.

Figure 2:
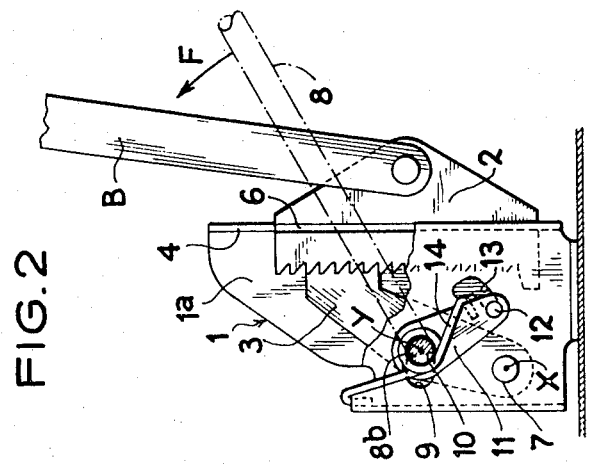

A spring 14 acts between the fixed support 1 and the crank 11 so as to maintain the latter in the position shown in FIG. 2, that is, in the position for locking the stop pawl 3.

Figure 4:
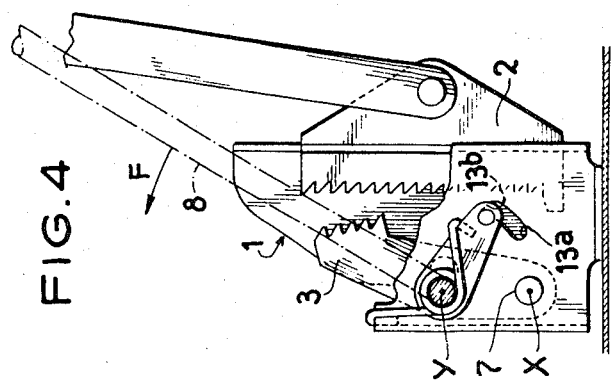
FIGS. 2, 3 and 4 are sectional views of the device in three different positions.
Figure 3:
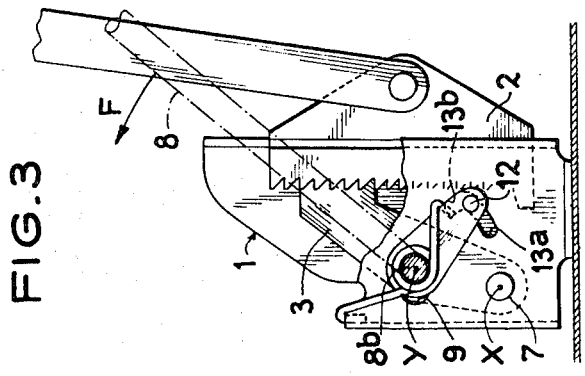

The operation of the support device according to the invention will now be explained in detail with reference to FIGS. 2, 3 and 4, assuming that the seat is maintained in a given longitudinal position by a locking device which has not been shown since, strictly speaking, it forms no part of the invention.

When the device is in the locked position (FIG. 2), the teeth of the stop pawl 3 are engaged in the teeth of the rack 2 and thus lock the latter and the seat in a given position. Indeed, disengagement of the teeth, by rotation of the pawl 3 about the axis X—X, cannot occur since the portion 8b of the lever is held stationary by the crank 11 whose finger portion 12 is retained by the upper edge of the branch 13a of the opening 13 which is concentric with the axis Y—Y. No unlocking reaction can therefore occur.

To adjust the seat in height, the shifting lever 8 must be shifted from this locked position in the direction of arrow F in opposition to the action of the spring 14.

This causes the crank 11 to rotate about the axis Y—Y. The finger portion 12 moves along the branch 13a of the opening 13 and finally occupies the position shown in FIG. 3.

The device is then locked and, when the control lever 8 is continued to be shifted in the direction of arrow F the finger portion 12 is guided towards the upper end of the branch 13b which is roughly centered on the axis X—X and the portion 8b moves in the apertures 9 towards the left (as viewed in the drawing) and in so moving, shifts the pawl 3 and disengages it from the rack 2. In this way, the position shown in FIG. 4 is reached in which the pawl 3 is completely disengaged from the rack 2.

If the user bears against the backrest or the cushion of the seat so as to tilt the latter, it is then possible to bring the cushion to the new desired position. It is sufficient to release the control lever 8 for the action of the weight of the crank 11 and lever 8a and the action of the spring 14 to return the assembly to the locked position shown in FIG. 2.

Thus the mere shifting of the lever 8 in the direction of arrow F produces, in a first stage, an unlocking of the pawl 3 then, in a second stage, the disengagement of the pawl from the rack teeth and the unlocking of the rack 2. Moving the lever 8 in the opposite direction, results in a positive interlocking of the stop pawl and the rack and this ensures that the rack does not accidentally become disengaged.

Further, the precision of the adjustment, defined as the difference between two adjacent positions of adjustment, is equal to the space between two adjacent teeth of the rack or of the pawl and therefore can be chosen as desired. Similarly, the range of adjustment can be relatively wide with respect to that obtained in known devices, the two extreme positions of adjustment being determined in one direction by the rack contacting the floor or a member secured to the latter, and, in the other direction, by the rack coming in contact with an abutment provided on the support member 1.

Although the link has been shown to be pivoted to the rack 2, it is also possible to reverse the functions of the two complementary toothed elements.

Having now described my invention what I claim and desire to secure by Letters Patent is:

1. A support device for a seat in particular for a vehicle having a floor, comprising rear support means and front support means, the front support means comprising a support member integral with or fixed to the floor and having two parallel wing portions defining parallel guide means and a transverse wall interconnecting the wing portions, a rack member having a toothed front portion and two lateral faces provided with two parallel guide means slidably engaging said guide means of the fixed support member respectively, link means interconnecting said rack member and the seat, a toothed pawl member pivoted about a first axis on said front support means and having a toothed portion facing the toothed front portion of the rack, and shifting and locking means for selectively disconnecting and maintaining said rack and pawl members engaged so as to allow selectively an adjustment in height of said rack member and the locking of said rack member with respect to the front support member in a selected position.

2. A device as claimed in claim 1, wherein each wing portions of said support member has a flange extending towards the flange of the other wing portion, and the rack member has two grooves provided in its lateral faces, respectively, and slidably engaging said flanges.

3. A device as claimed in claim 1, wherein the pawl is rotatable about a first axis between the two wing portions of the support member, said shifting and locking means comprising a shifting lever having a rectilinear portion which has a second axis parallel to said first axis, a first aperture in the pawl, two second apertures in the support member and centered on said first axis, the rectilinear portion of the shifting lever being rotatably mounted in the first aperture and guided in the second apertures, and a crank which is integral with the rectilinear portion of the shifting lever and carries a finger portion, an opening in the support member guiding the finger portion, the opening comprising two branches, a first of said branches being substantially centered on said second axis when said rectilinear portion is in a position corresponding to engagement between the pawl and the rack, and a second of said branches being substantially centered on said first axis.

4. A device as claimed in claim 3, comprising resiliently yieldable means for biasing the crank to a position which corresponds to the engagement and locking of the pawl with respect to the rack.

* * * * *